United States Patent [19]

Boyd

[11] Patent Number: 4,750,847
[45] Date of Patent: Jun. 14, 1988

[54] L-SHAPED BEARING ASSEMBLY

[75] Inventor: Richard M. Boyd, St. Louis Park, Minn.

[73] Assignee: Quadion Corporation, Minneapolis, Minn.

[21] Appl. No.: 92,657

[22] Filed: Sep. 3, 1987

[51] Int. Cl.⁴ .......................... F16C 33/74; F16J 9/00; F16J 15/00

[52] U.S. Cl. .............................. 384/130; 277/206 A; 277/194; 277/168; 384/140; 384/153

[58] Field of Search ............... 384/130, 138, 139, 140, 384/147, 152, 153, 144; 277/194, 198, 199, 168, 170, 171, 176, 206 A, 187

[56] References Cited

U.S. PATENT DOCUMENTS

| Re. 24,332 | 6/1957 | Svenson | 286/7 |
|---|---|---|---|
| 1,900,849 | 3/1933 | Ackerman | 384/153 |
| 2,873,132 | 2/1959 | Tanner | 288/19 |
| 2,954,264 | 9/1960 | Tisch et al. | 309/23 |
| 2,968,501 | 1/1961 | Tisch | 286/26 |
| 2,983,533 | 5/1961 | Tisch | 288/19 |
| 3,322,433 | 5/1967 | Rentschler | 277/228 |
| 3,418,001 | 12/1968 | Rentschler et al. | 277/165 |
| 3,421,412 | 1/1969 | Ackley | 384/138 |
| 4,199,199 | 4/1980 | Granda | 384/138 X |
| 4,281,942 | 8/1981 | Gaeckle | 277/206 A X |

Primary Examiner—John Petrakes
Assistant Examiner—Thomas R. Hannon
Attorney, Agent, or Firm—Schroeder & Siegfried

[57] ABSTRACT

A bearing assembly designed to preclude the escape of lubrication through bushings within which elongated shafts are rotated at high speeds. The bearing assembly is comprised of a bearing member of split-ring form which is made of a readily moldable self-lubricating material having a pressure velocity value at least equal to 1800 at 100 feet per minute surface speed, and is L-shaped in cross-sectional configuration. It includes an elastomeric sealing ring mounted in supporting relation to the sealing portion of the L-shaped bearing member which is compressed therewith within a groove provided for that purpose at the outer end of the bushing. The sealing ring maintains the bearing member in close-fitting, sealing relation to the sealing surface surrounding the shaft and is insulated by the bearing member from the sealing surface having rapid relative movement and from associated parts to thereby obviate the normally attendant destructive effects of high speed rotation upon such a ring.

26 Claims, 3 Drawing Sheets

L-SHAPED BEARING ASSEMBLY

BACKGROUND OF THE PRIOR ART

High speed rotation or other high speed movement of metal parts relative to each other requires substantial lubrication therebetween. For example, the steel shafts which carry cotton pickers at their outer ends are rotated at very high speeds within bronze bushings. Because of the differences in the coefficients of expansion of steel and brass, certain tolerances are required to compensate therefor and lubrication is provided to minimize friction and the attendant generation of heat and undue wear. Because of such tolerances, the lubrication escapes between the bronze bushing and the shaft, as the adjacent parts of different metals heat and cool because of such high speed relative movement.

The usual attempted remedy to prevent such escape of lubricant is to apply an elastomeric sealing ring at the end of or within the bushing, but the high speed rotation quickly causes undue friction, heat and wear, and consequent destruction of the ring. Each cotton picking machine may carry as many as 1920 high-speed rotating shafts with cotton-picking devices at their outer end. Experience has shown that despite filling the gear box housing with eight (8) gallons of grease every ten (10) hours, after 1½ hours of operation of the machine, such high-speed shafts are operating within their bushings under essentially dry conditions. In other words, substantially all of the lubricant has been lost and the machine is operating under adverse and unsatisfactory conditions, causing excessive wear. This is just one example of wear problems which exist with respect to machines using high speed rotating shafts.

No satisfactory solution has heretofore been found for the above problems. As a consequence, the heavy loss of lubricant from such machines is costly and environmentally damaging. Equally as important is the excessive wear which it causes in the machines, with consequent costly down time, delay and undue repair and expense. The high speed rotation of the shaft quickly generates excessive friction and heat between the shaft and sealing ring so that the latter wears excessively or is destroyed completely, with a complete loss of the sealing function. Thermal expansion of the shaft imposes additional pressure against the sealing surface of the sealing ring and thereby increases the wearing effects thereupon. Consequent variations in diameter of the shafts increases the leakage and ring wear problems and makes it impractical and virtually impossible to compensate therefor.

My new bearing assembly provides a marked improvement in ways of alleviating the above problems, in that it provides an automatically compensating seal in which the sealing ring is insulated from the rapidly moving member to prevent undue wear of the ring and the assembly is constructed so as to automatically adjust to variations in the shaft diameter and to effectively complete the seal thereround despite such variations.

BRIEF SUMMARY OF THE INVENTION

My invention provides an effective bearing assembly which furnishes an efficient relatively long-wearing and effective seal at a minimum of expense for installation which include metal shafts rotating with lubrication within metal bushings at extremely high speeds. As indicated hereinbefore, such installations normally experience a high wear attrition because the high speed destroys the elastomeric sealing rings normally used, with resultant loss of substantially all lubrication and consequent excessive wear of the bushing. There are extremely large numbers of such installations in the field and my bearing assembly will extend their useful life extensively. For example, the bushing surrounding the rapidly rotating shaft of a cotton picker can be forced inwardly a short distance away from the spindle collar against which the bushing normal abuts to thereby create an annular groove of rectangular cross-section within the housing or steel nut (which surrounds the bushing) and between the collar and outer end of the bushing. When one of my bearing assemblies is installed in that groove, it effectively seals against the escape of lubrication and thereby greatly increases the wear-life of the entire installation.

My bearing assembly is comprised of two separate parts which cooperate to perfect the seal described above. Both parts are important for different reasons. The bearing is necessarily formed of a self-lubricating material having a pressure velocity value of at least 1800 at 100 feet per minute in order to adequately lubricate the wear surface between same and the shaft. To minimize expense, such a material should be moldable. There are a number of themoplastic and thermosetting materials which have such properties and are well known in the art. The bearing also serves to protect the sealing ring from the rapidly rotating shaft and collar.

Such a bearing should be non-continuous, or split in order to enable same to compensate for the variations in diameter of the shaft, caused by the temperature changes therein involved as a result of high speed rotation. Without such compensations, undue wear will result between the shaft and bearing. However, with such compensations, there is a need for maintaining the contact between the bearing and the shaft at the appropriate pressure. This need is fulfilled by the elastomeric ring which encircles the bearing. It is important that such pressure be constant, but moderate. To that end, I have designed a sealing ring which has a cross-sectional configuration which makes it highly sensitive and flexible. As a consequence, compression thereof between the groove wall and the bearing causes the latter to support the rapidly rotating shaft adequately and perfect a seal thereagainst without undue friction. As the diameter of the shaft increases because of temperature elevations, the split bearing expands and the sensitive and readily yieldable sealing ring is extended without undue compressive force being applied thereto. When the shaft contracts, as when the machine is stopped, the bearing is urged toward a smaller circumference by the elastomeric sealing ring, and thus a proper seal is maintained between the shaft and the bearing surface. It is also maintained by the sealing ring compressed between the housing and the bearing. Thus, the escape of lubricant is effectively prevented.

An important advantage provided by the design of the sealing ring which I have conceived is the sensitivity and ready forgiveness thereof to changes in pressure. Other types of rings will not function as well because they cannot compensate for the conventional large manufacturing tolerance of the groove. In other words, a bearing with such a sealing ring will not be sufficiently sensitive and adjustable to changes in shaft diameter to maintain an adequate seal.

BRIEF DESCRIPTION OF THE DRAWINGS

A detailed description of one preferred embodiment of the L-SHAPED BEARING ASSEMBLY is hereafter described with specific reference being made to the drawings in which.

Figure 1:
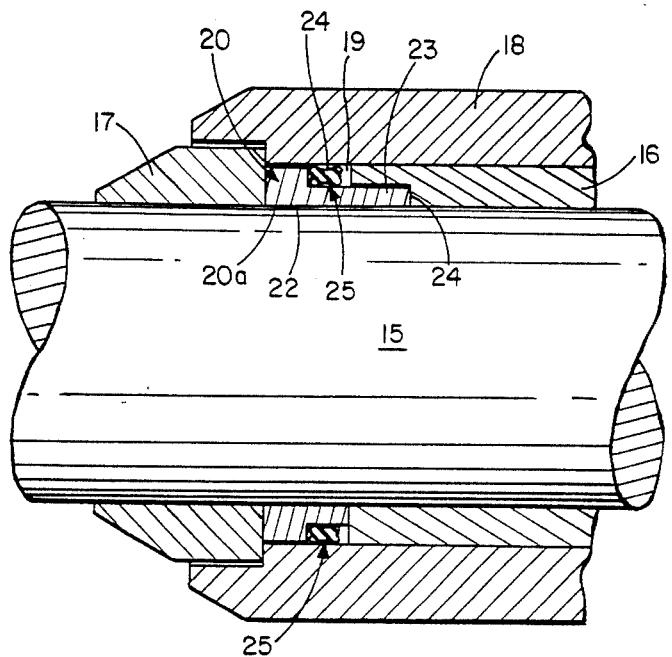
FIG. 1 is a fragmentary vertical sectional view of a bearing assembly utilizing the L-shaped bearing of my invention wherein the seal is prefected on the inner diameter of the bearing member.
Figure 2:
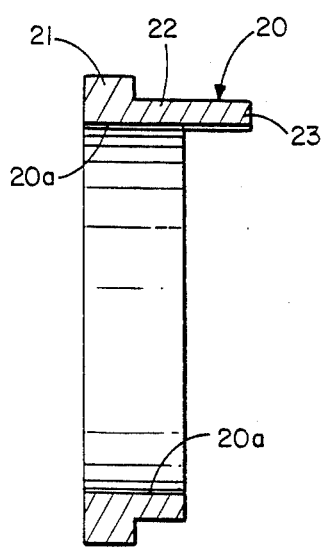
FIG. 2 is a vertical sectional view on an enlarged scale of that L-shaped bearing, taken along line 2—2 of FIG. 3.
Figure 3:
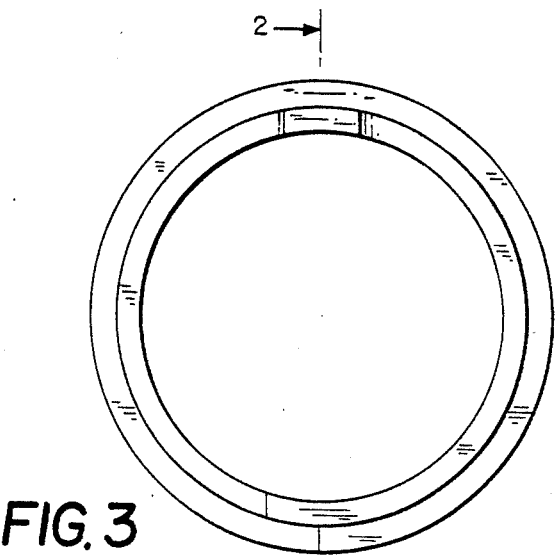
FIG. 3 is an end elevational view of that bearing.

One embodiment of my invention which is preferred, is shown in FIGS. 1-7, inclusive. As indicated hereinabove, I find that if an efficient way can be provided to prevent the escape of lubricant from the gear boxes of machines such as cotton pickers, a great saving can be effected. The embodiments described herein provide such a means.

To accomplish this saving, I provide a bearing assembly comprised of a molded non-continuous, split-ring, self-lubricating annular bearing member which is formed of a moldable self-lubricating material having a pressure velocity value at least equal to 1800 at 100 feet per minute. The bearing assembly which I utilize functions as a double bearing in that it provides a bearing surface against the shaft and also precludes undue wear of the sealing member which I utilize to compensate for the differences in the co-efficient of expansion of steel and brass. The sealing ring which I utilize as a part of the bearing assembly functions as an elestromeric spring.

The bearing member is formed of a plastic material which is preferably thermoplastic; however thermosetting materials may be used. Some examples of the materials which I have found well adapted for this purpose are unmodified polycarbonates and unmodified polystyrenes. These two materials will work well in low speed, low pressure applications and are relatively inexpensive. The temperature at which the relatively moving parts operate determine the decision as to which type of plastic will be selected. For cost reasons, the bearing should be moldable, which means that it should be either injection-moldable or moldable via transfer molding. For cost effectiveness, probably a 6/10 nylon with modifiers would be most desirable in the long run, since it will cover a wide variety of applications and is relatively inexpensive. Other materials which can be utilized are polyethylene, polypropylene, styrene and polyvinylchlorene, all of which are thermoplastics. The important considerations are that the material be moldable and that it have a pressure-velocity value of no less than 1800 at 100 feet per minute surface speed.

As shown in FIGS. 1-7, my bearing assembly may be utilized in conjunction with a shaft 15 which rotates about its longitudinal axis at high speed within a bronze bushing 16. The upper ends of this shaft and bushing terminate with a gear box (not shown) which contains lubricant designed to properly lubricate the relatively moving surfaces of these two parts. A spindle collar 17 is press-fitted upon the shaft 15 and rotates therewith below the lower end of the bushing 16. A steel nut 18 extends downwardly around the spindle collar 17, as shown. This is the normal arrangement of these parts in the cotton picker as originally manufactured and put into use.

The bearing member 20, as shown in FIGS. 1-4, inclusive, is generally L-shaped in cross-sectional configuration so that a portion thereof 21 has radial dimensions substantially equal to the depth of the groove 19 while an axially spaced portion 22 thereof has lesser radial dimensions. This bearing member is molded of such material as described hereinabove. The bearing member 20 has a sealing surface 20a at its ID which bears against the shaft 15 and perfects a seal thereagainst. The axial dimensions of the bearing member 20 are slightly less than the actual dimensions of the groove 19.

A tang member 23 extends laterally in the form of an axial projection upwardly into an opening 24 which I form in end of the bronze bearing 16. The purpose of the tang 23 and the opening 24 is to prevent the bearing member 20 from rotating with the shaft 15. The self-lubricating properties of the bearing member 20 prevents substantial wear thereof as the shaft 15 rotates. The differences in the radial dimensions of the two portions 21 and 22 provides a secondary groove 24 within which I install an elastomeric spring in the form a sealing ring 25.

The bearing member 20 is uniform in cross-sectional configuration, the axial length being preferably approximately 0.140 inches in length. The radial dimensions of the portion 22 is preferably approximately 0.030 inches and the radial extent of the thicker area 21 is approximately 0.059-0.065.

The internal diameter of the seal is preferably 0.488 inches in diameter. The outward extent of the tang 23 is approximately 0.1 inches beyond the portion 22 of the bearing having the lesser radial dimensions. The axial extent of the portion 22 is approximately 0.07 inches.

Figure 4:
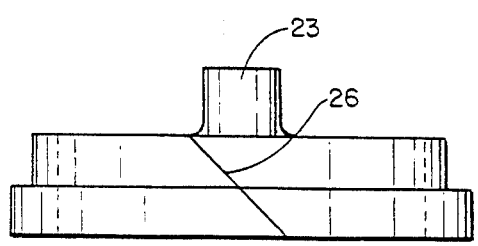
FIG. 4 is a top plan view thereof.
Figure 6:
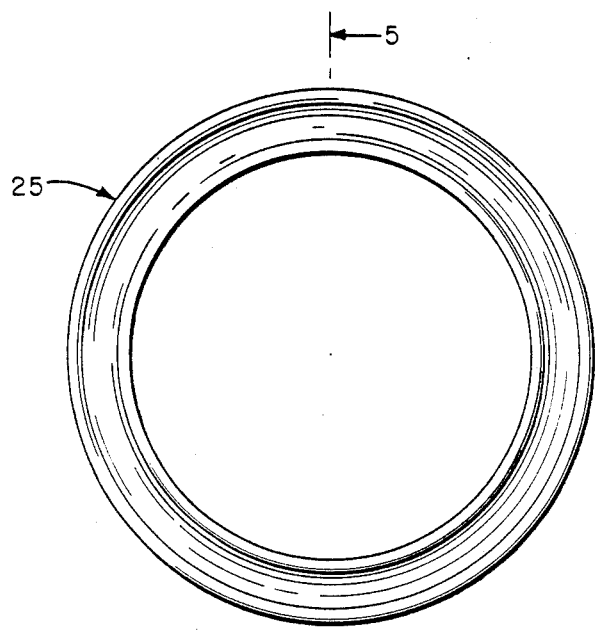
FIG. 6 is an end elevational view of said sealing ring.
Figure 5:
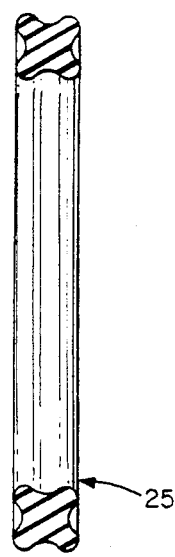
FIG. 5 is a vertical sectional view of the sealing ring of FIG. 1 which is utilized in my invention to hold the L-shaped bearing in sealing position, taken along line 5—5 of FIG. 6.

As previously stated, the bearing member 20 is not continuous in that it is comprised of a split ring, the split being shown and identified with the numeral 26 in FIG. 4. Thus, the ends of the bearings at the split 26 are capable of adjustment relative to each other. This feature is important in permitting the bearing to adjust to the variations in diameter caused by the heat which is generated by the high speed of rotation of the shaft 15.

Figure 7:
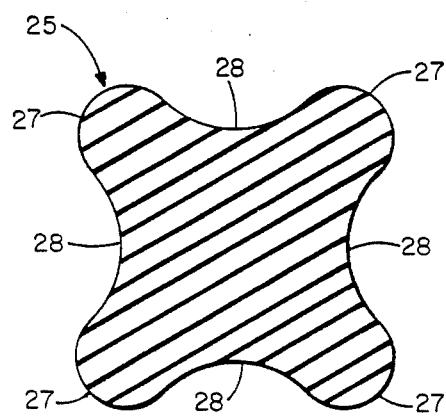
FIG. 7 is a vertical sectional view on an enlarged scale of the ring shown in FIG. 5.

The elastomeric spring 25 is made of a uniformly resilient flowable rubber-like material which is generally an elastomer having properties similar to rubber. As best shown in FIG. 7, this ring 25 is right-angled polyganal in cross-sectional configuration, preferably having maximum radial dimensions equal to its maximum axial dimensions. The ring is symmetrical and uniform throughout in cross-sectional shape. As shown, each of its sides is concave and each of its corner portions have convex lobes 27 thereat. The concavities between the lobes 27, identified by the numeral 28 have a radius of curvature approximating 28% of the maximum cross-sectional dimension of the ring. The concavities 28 merge tangently with the convex lobes 27.

The maximum radial dimension of the ring 25 when combined with the radial dimension of the thinner portion 22 of the bearing against which it bears, is slightly greater than the radial dimensions of the groove 24 so that as a result, the bearing 20 is always maintained under slight radial compression by the ring 25 in order to perfect the seal between the bearing 20 and the shaft 15 at the surface at which they meet.

The ring 25, unlike the bearing 20 is continuous throughout and is of uniform cross-sectional configuration throughout. The radius of the convex corner lobes 27 is approximately 16% of the maximum radial dimension of the ring. I have found that a ring which has an internal diameter of approximately 0.54 inches and has maximum radial and axial dimensions of approximately 0.048 inches works in a highly satisfactory manner. Such a ring has minimum radial dimensions between the opposed concave surfaces 28 of approximately 0.036 inches. The radius of curvature of the concavities 28 is approximately 0.016 inches and the radius of curvature of the convex corner lobes 27 is approximately 0.008 inches.

Figure 8:
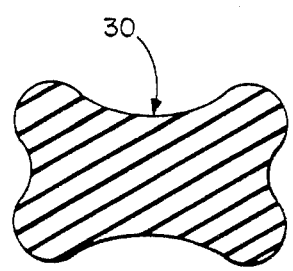
FIG. 8 is a vertical sectional view of a sealing ring of modified cross-section which may be used with a similar but slightly different bearing member.

The ring 25 need not necessarily be generally square in cross-section as shown and described. Instead, the groove may be made axially longer, with the result that the ring will have a greater axial length than its radial dimension, such as is shown by the ring 30 in FIG. 8. Such a ring may be utilized when the groove has greater axial dimensions than its radial dimensions. It will be noted, however, that the combined radial dimension of the ring 30 and of the portion of the bearing member against which it bears will be slightly greater than the radial dimensions of the groove. Similarly, and like the installation shown in FIG. 1 and as described herein, the axial dimensions of the ring 30 when combined with the axial dimensions of the portion of the bearing member along which it extends will be slightly less than the axial dimensions of the groove.

Figure 9:
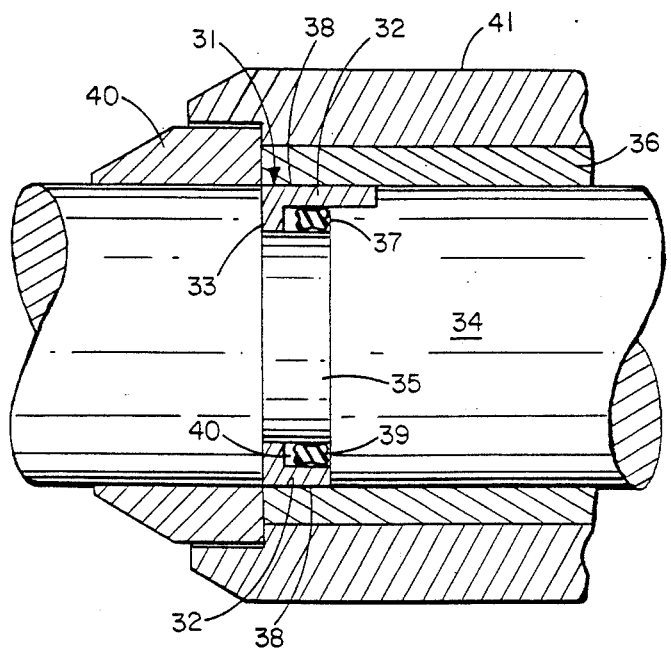
FIG. 9 is a fragmentary vertical sectional view of a different but similar bearing assembly wherein the seal is perforated on the outer diameter of the bearing member.
Figure 10:
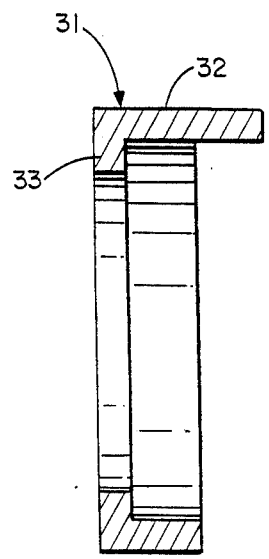
FIG. 10 is a vertical sectional view on an enlarged scale of the bearing member shown in FIG. 9.
Figure 11:
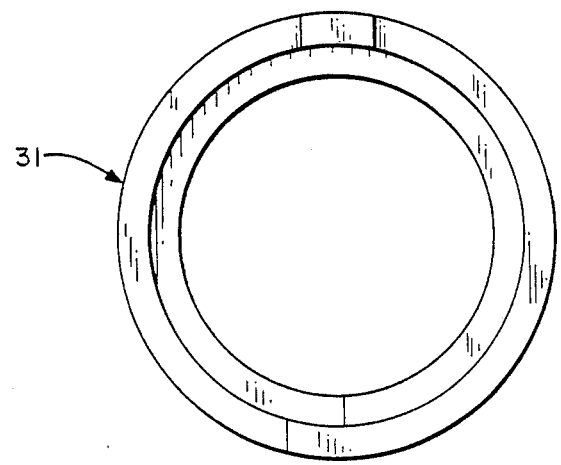
FIG. 11 is an end elevational view of the bearing member shown in FIG. 10.

FIGS. 9-12 show a construction similar to that shown in FIGS. 1-7 except that the bearing is constructed in such a way that the seal is perfected between the housing and the shaft at the OD surface of the bearing member. Thus, as seen in FIGS. 9-10, the section of the bearing 31 which has the greater axial dimension is at the external circumference of the bearing member. The portion which has the lesser radial dimension is identified by the numeral 32 and the portion having the greater dimension is identified by the numeral 33. Thus, the portion 32 has lesser radial dimensions than the portion 33 but has greater axial dimensions and the seal is perfected at the OD surface of the bearing member 31 instead of at the ID surface the bearing member as shown in FIG. 1. In all other respects, the installation is similar except that the bearing member rotates with the shaft 34.

It will be seen that a groove 35 is formed in the shaft. The latter rotates within the bronze bushing 36 and defines the groove 35 therewith. The bearing 31 lies within this groove and the outer surface of the portion 32 perfects a seal as at 38 against the bearing 36.

The sealing ring 39 may have the same dimensions and relationship to the secondary groove 40 as defined hereinabove with respect to the ID seal shown in FIG. 1 in that the sealing ring 39 has radial dimensions such as to maintain the portion 32 of the bearing member 31 under compression against the inner surface of the bushing 36. Numerals 40 and 41 identify the spindle collar and steel nut, respectively.

Figure 12:
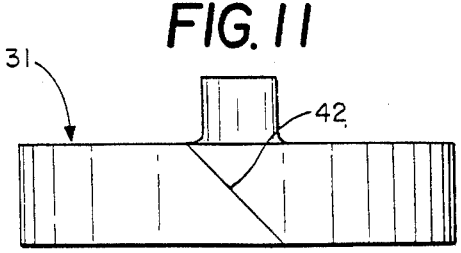
FIG. 12 is a top plan view of the bearing member shown in FIGS. 10 and 11.

The bearing 31 is split as indicated by the numeral 42 in FIG. 12 so that the ends thereof may shift relative to each other and thus compensate for the variations in surface dimensions caused by the heat generated by the rapidly rotating shaft 34. As indicated, the sealing ring 39 maintains the bearing under compression against the inner surface of the bushing 36 to perfect the seal between the bearing 31 and the bushing 36. It also has lesser axial dimensions than the groove 37 and bears against portion 33 of the bearing.

In operation, the elastomeric spring which is in the form of a sealing ring such as elements 25, 39, maintains the bearing members under compression against the surface at which the seal is to be perfected. This surface is at the surface of the bearing member which has the greater axial dimensions. I have found that through the use of a bearing member such as described herein, I can greatly diminish the loss of lubricants from such installations and that as a result thereof, there is a very great reduction in down-time and need for replacement of parts, because the wear that is experienced is greatly reduced. This occurs because the lubricant is contained in the gear box and as a consequence, the bronze bushing remains lubricated over much greater extended periods than has heretofore been experienced. The sealing rings 25 and 31 function to maintain a slight pressure against the bearing member at all times so that maximum advantage may be taken of its inherent self-lubricating qualities. This insures long wear and at the same time provides an effective seal to prevent the escape of lubricant between the shaft and the bronze bushing.

The elastomeric rings 25, 39 are highly yieldable and sensitive and, therefore, ready compensation is provided for variations in dimensions caused by changes in temperature of the relatively rotating parts. While I have shown installations which are designed to greatly extend the useful life span of parts of machines which are already in the field, it will be readily appreciated that similar constructions may be utilized by original equipment manufacturers and that when this is done, there will be a great improvement in the performance of such machinery, and the useful life span thereof will be substantially extended.

What is claimed:
1. A bearing assembly comprising:
(a) a shaft member constructed and arranged to be rotated at high speed about its longitudinal axis;
(b) a housing member surrounding said shaft and constructed and arranged to contain lubricating fluid in surrounding and lubricating relation to said shaft member as it rotates;
(c) said housing member and said shaft member being constructed and arranged to cooperatively define an annular groove therebetween;
(d) a molded, non-continuous, split-ring self-lubricating annular bearing formed of moldable self-lubricating material having a pressure velocity value at least equal to 1800 at 100 feet per minute surface speed;

(e) said bearing being disposed within said annular groove and having maximum axial dimensions substantially equal to the axial dimensions of said groove and extending in encircling relation to said shaft member and having a portion thereof engaging one of said members in sealing relation;

(f) said bearing having one axial portion thereof of greater radial thickness than the other and being of substantially uniform cross-sectional configuration throughout;

(g) a sealing ring made of a uniformly resilient, flowable rubber-like material mounted within said groove axially opposite said portion of said bearing having the lesser radial thickness and bearing thereagainst and cooperatively perfecting therewith a seal between said shaft member and said housing member;

(h) said sealing ring extending within said groove alongside said portion of said bearing having the greater radial thickness;

(i) the axial dimensions of said sealing ring, combined with the axial dimensions of said portion of said bearing having the greater radial thickness, being less than the axial dimensions of said groove; and (j) the combined radial dimensions of the portion of said bearing having the lesser radial thickness and of said sealing ring in its free form slightly exceeding the radial dimensions of said groove, whereby said sealing ring and said latter portion are maintained under slight radial compression within said groove, and a seal between said housing member and said shaft member is thereby perfected and maintained.

2. A bearing assembly comprising:

(a) a molded, non-continuous split-ring self-lubricating bearing member formed of moldable self-lubricating material having a pressure velocity value at least equal to 1800 at 100 feet per minute surface speed;

(b) said bearing member being substantially uniformly generally L-shaped in cross-sectional configuration throughout and having one axial portion thereof of lesser radial thickness than the remainder thereof, said portion having an annular sealing-ring-engaging surface;

(c) a sealing ring made of a uniformly resilient flowable rubber-like material mounted in engaging relation against said sealing-ring-engaging surface of said portion of said bearing member and extending therealong throughout, and having one of its circumferential surfaces in its free form equal to one of the circumferential surfaces of said portion;

(d) said sealing ring extending alongside the remainder portion of said bearing member having the greater radial thickness;

(e) said sealing ring having a generally right-angled polygonal cross-sectional configuration and having a pair of concave opposed radially spaced working surfaces and a pair of axially spaced surfaces;

(f) said sealing ring in its free form having convexly curved corner portions merging in a continuous arc with the concavities of said surfaces;

(g) support structure including a pair of opposed surfaces, one of which is constructed and arranged to move rapidly relative to the other, such support structure surrounding said bearing member and said sealing ring and defining an annular primary groove in one of said surfaces within which said bearing member and said sealing ring extends;

(h) the axial dimensions of said sealing ring, combined with the axial dimensions of said portion of said bearing member having the greater radial thickness, being less than the axial dimensions of said groove;

(i) said sealing ring in its free form having maximum radial cross-sectional dimensions which, together with those of the portion of said bearing member having the lesser radial thickness, slightly exceed the radial dimensions of said groove and therefore being under slight compression in a radial direction while disposed within said groove; and (j) said bearing member having an axially extending sealing surface gently urged in a radial direction within said groove toward its opposed surface by said sealing ring under compression, to thereby perfect a seal across said groove.

3. A bearing assembly comprising:

(a) a shaft constructed and arranged to be rotated at high speed about its longitudinal axis;

(b) a collar carried by said shaft and fixed thereto in encircling sealed relation;

(c) a bushing rotatively supporting said shaft for rotation about its longitudinal axis and terminating in adjacent but spaced relation to said collar;

(d) a housing surrounding and supporting said bushing and extending beyond the same into close proximity with said collar and cooperatively defining an annular groove around said shaft with said collar and one end of said bushing;

(e) a molded, non-continuous, split-ring self-lubricating annular bearing member formed of moldable, self-lubricating material having a pressure velocity value at least equal to 1800 at 100 feet per minute surface speed;

(f) said bearing member being generally L-shaped in cross-sectional configuration and having a portion thereof of lesser radial dimensions than the remainder thereof, and having axial dimensions substantially equal to the axial dimensions of said groove and being disposed therewithin;

(g) a sealing ring made of a uniformly resilient flowable rubber-like material mounted within said groove in encircling relation to said portion of said bearing member having lesser radial dimensions;

(h) the inner circumference of said sealing ring being substantially equal to the external circumference of said portion of said bearing member having lesser radial dimensions;

(i) the axial dimensions of said sealing ring combined with the axial dimensions of said portion of said bearing having the larger radial dimensions being less than the axial dimensions of said groove; and (j) the combined radial dimensions of the portion of said bearing having the lesser radial dimensions and of said sealing ring in its free form slightly exceeding the radial dimensions of said groove whereby said sealing ring and said latter portion are maintained under slight radial compression about said shaft.

4. The structure defined in claim 3 wherein the axial dimensions of said bearing exceed its radial dimensions.

5. The structure defined in claim 3 and (j) tang means carried by said bearing for anchoring same against movement relative to said housing.

6. The structure defined in claim 3 and
   (j) anchor means carried by said bearing and extending axially therefrom for anchoring same against movement relative to said bushing.
7. The structure defined in claim 3 and
   (j) anchor means carried by said bearing and extending outwardly therefrom for anchoring same against rotation with said shaft.
8. The structure defined in claim 3 wherein the axial dimensions of said sealing ring exceeds the radial dimensions thereof in its free form.
9. The structure defined in claim 3 wherein said bearing member and said housing cooperatively define a secondary annular groove, the axial dimensions of which exceed its radial dimensions and within which said sealing ring is disposed.
10. The structure defined in claim 3 wherein said sealing ring in its free form extends radially outwardly beyond said portion of said bearing having the greater radial dimensions.
11. The structure defined in claim 3 wherein said portion of said bearing having the lesser radial dimensions has a radial dimension approximating 0.03–0.06 inches.
12. The structure defined in claim 3 wherein said portion of said bearing having the lesser radial dimensions has a radial dimension of approximately 0.03 inches.
13. The structure defined in claim 3 wherein said portion of said bearing having the lesser radial dimension has a radial dimension of no more than approximately 0.06 inches.
14. The structure defined in claim 3 wherein said sealing ring is symmetrical in cross-sectional configuration.
15. The structure defined in claim 3 wherein said groove has radial dimensions equal to the radial dimensions of said bushing.
16. The structure defined in claim 3 wherein said groove has a generally right-angled polygonal cross-sectional configuration.
17. A bearing assembly comprising:
   (a) a shaft constructed and arranged to be rotated at high speed about its longitudinal axis;
   (b) a collar carried by said shaft and fixed thereto in encircling sealed relation;
   (c) a bushing rotatively supporting said shaft for rotation about its longitudinal axis and terminating in adjacent but spaced relation to said collar;
   (d) a housing surrounding said bushing and extending beyond the same into close proximity with said collar and cooperatively defining an annular groove around said shaft with said collar and one end of said bushing;
   (e) a molded, non-continuous, split-ring self-lubricating annular bearing member formed of moldable, self-lubricating material having a pressure velocity value at least equal to 1800 at 100 feet per minute surface speed;
   (f) said bearing member being disposed within said annular groove and having axial dimensions substantially equal to the axial dimensions of said groove and having a portion thereof engaging said shaft in encircling relation, said portion being of lesser radial dimensions than the remainder thereof;
   (g) a sealing ring made of a uniformly resilient, flowable rubber-like material mounted within said groove in encircling relation to said portion of said bearing member having lesser radial dimensions;
   (h) the inner circumference of said sealing ring being substantially equal to the external circumference of said portion of said bearing member having lesser radial dimensions;
   (i) the axial dimensions of said sealing ring combined with the axial dimensions of said portion of said bearing having the larger radial dimensions being less than the axial dimensions of said groove;
   (j) the combined radial dimensions of the portion of said bearing having the lesser radial dimensions and of said sealing ring in its free form slightly exceeding the radial dimensions of said groove whereby said sealing ring and said latter portion are maintained under slight radial compression about said shaft.
18. A bearing assembly comprising:
   (a) a molded, non-continuous, split-ring self-lubricating bearing member formed of moldable self-lubricating material having a pressure velocity value at least equal to 1800 at 100 feet per minute surface speed;
   (b) said bearing member being generally L-shaped in cross-sectional configuration and having a portion thereof of lesser radial dimensions than the remainder thereof;
   (c) a sealing ring made of a uniformly resilient flowable rubber-like material mounted in encircling relation to said portion of said bearing member having lesser radial dimensions and having an inner diameter substantially equal to the external circumference of said last-mentioned portion;
   (d) said sealing ring having a generally right-angled polygonal cross-sectional configuration and having a pair of concave radially spaced working surfaces and a pair of concave axially spaced surfaces;
   (e) said sealing ring in its free form having convexly curved corner portions merging in a continuous arc with the concavities of said surfaces;
   (f) support structure surrounding said bearing and said sealing ring and defining an annular primary groove within which said bearing member and said sealing ring extends;
   (g) said bearing member and said groove having substantially equal axial dimensions;
   (h) the radial depth of said groove being substantially equal to the maximum cross-sectional radial dimensions of said bearing member;
   (i) the axial width of said groove being slightly greater than the sum of the maximum axial cross-sectional dimensions of said sealing ring in its free form and of the portion of said bearing member having the greater radial dimensions; and
   (j) said sealing ring in its free form having maximum radial cross-sectional dimensions which, together with those of the portion of said bearing having the lesser radial dimensions slightly exceed the radial dimensions of said groove and being under slight compression in a radial direction while disposed within said groove.
19. The structure defined in claim 18 wherein said sealing ring has an inner diameter slightly less than the external circumference of said portion of said bearing having lesser radial dimensions.
20. The structure defined in claim 18 wherein said bearing member and said support structure cooperatively define a secondary annular groove therebetween and said sealing ring extends within said secondary groove, the maximum radial cross-sectional dimensions of said sealing ring in its free form being slightly greater than the radial dimensions of said secondary groove.

21. The structure defined in claim 18 wherein said bearing member and said support structure cooperatively define a secondary annular groove therebetween and said sealing ring extends within said secondary groove, the maximum radial cross-sectional dimension of said sealing ring in its free form being slightly greater than the radial dimensions of said secondary groove, the maximum axial dimensions of said sealing ring in its free form being less than the axial dimensions of said secondary groove.

22. The structure defined in claim 18 wherein the axial dimensions of said groove are equal to the maximum axial dimensions of said bearing.

23. The structure defined in claim 18 wherein said sealing ring is symmetrical in cross-sectional configuration.

24. The structure defined in claim 18 wherein said portion of said bearing having lesser radial dimensions has radial dimensions approximately 0.03–0.06 inches.

25. The structure defined in claim 18 wherein said portion of said bearing having lesser radial dimensions has radial dimensions approximating 0.03 inches.

26. The structure defined in claim 18 wherein said portion of said bearing having lesser radial dimensions has radial dimensions no greater than 0.06 inches.

* * * * *

UNITED STATES PATENT AND TRADEMARK OFFICE
CERTIFICATE OF CORRECTION

PATENT NO.  : 4,750,847
DATED       : June 14, 1988
INVENTOR(S) : Richard M. Boyd It is certified that error appears in the above-identified patent and that said Letters Patent is hereby corrected as shown below:

Column 3, line 54, "elestromeric" should read "elastomeric"

column 4, line 44, "of" should be inserted before "a sealing ring 25."

column 12, line 9, "approximately" should read "approximating"

Signed and Sealed this

Tenth Day of January, 1989

Attest:

DONALD J. QUIGG

*Attesting Officer*   *Commissioner of Patents and Trademarks*